United States Patent
Yadav et al.

(10) Patent No.: US 12,093,122 B2
(45) Date of Patent: Sep. 17, 2024

(54) INTELLIGENT LOG ANALYSIS AND RETENTION FOR MICROSERVICES APPLICATIONS

(71) Applicant: Dell Products L.P., Round Rock, TX (US)

(72) Inventors: Sunil Yadav, Bangalore (IN); Gururaj Kulkarni, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 276 days.

(21) Appl. No.: 17/579,872

(22) Filed: Jan. 20, 2022

(65) Prior Publication Data

US 2023/0229545 A1 Jul. 20, 2023

(51) Int. Cl.
*G06F 11/00* (2006.01)
*G06F 11/07* (2006.01)

(52) U.S. Cl.
CPC ...... *G06F 11/0787* (2013.01); *G06F 11/0721* (2013.01)

(58) Field of Classification Search
CPC ............. G06F 11/0787; G06F 11/0721; G06F 11/0772; G06F 11/0775; G06F 11/0766
See application file for complete search history.

(56) References Cited

U.S. PATENT DOCUMENTS

2020/0341868 A1* 10/2020 Carpenter ........... G06F 11/0709

FOREIGN PATENT DOCUMENTS

EP 2849476 A1 * 3/2015 ........... H04L 41/069

* cited by examiner

*Primary Examiner* — Katherine Lin
(74) *Attorney, Agent, or Firm* — Staniford Tomita LLP

(57) ABSTRACT

Embodiments for an intelligent log analysis and retention for microservices applications. Such log analysis is helpful in troubleshooting failure conditions that may occur intermittently or repeatedly within a microservices environment. Executed operations by microservices, applications, or components generate logs, and these logs are classified based on certain parameters. A default log retention period defines how long the logs are stored in the system, and a log analytical engine determines and assigns weights constituting additional retention time to keep logs for failed operations. These logs can then be analyzed to determine causes of the failure, and build failure models to predict future failure conditions. Logs for successful operations can be timely deleted to save storage space.

15 Claims, 6 Drawing Sheets

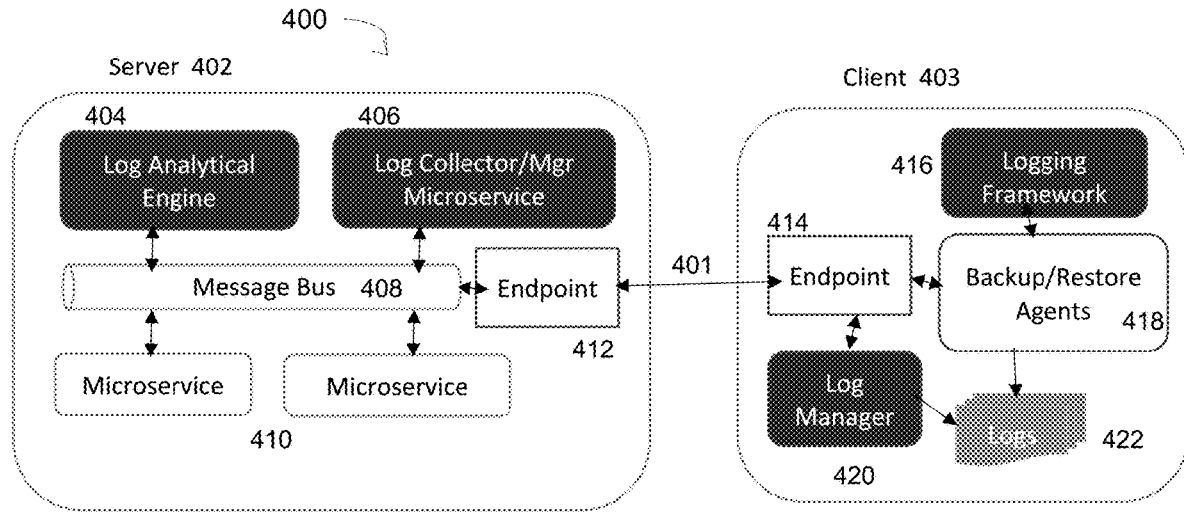

FIG. 4

TABLE 1

| PARAMETER | DESCRIPTION | WEIGHTING (DAYS) |
|---|---|---|
| Retention days | Number of days logs to be retained (soft & hard limits) | Calculate the retention days based on various weightings |
| Failure | Failed log, if repetitive failure keep only last few (e.g., 3) | 7 |
| Success | Keep only recent successful (e.g., 3) | 1 |
| Warnings and Alerts | Warning and alert messages | 4 |
| Critical errors | Critical alerts and messages | 5 |
| Frequency of occurrence of critical/warning/alerts | Operation may succeed but errors are repeated and needs attention | 6 |
| Exported by end user | Free already exported logs | 3 |
| Microservice/Application Type or Status | How many operations is each microservice involved and/or importance of microservice | Compute weighting based on type/importance information. An operation might succeed in one microservice but fail in another. Failed one has lower weighting than success. |

FIG. 5

TABLE 2

| Operation ID | Operation Type | Correlation ID | Components involved | Result | Weighting |
|---|---|---|---|---|---|
| 001ABC | backup | XXX-YYYY-ZZZ | AAA | Passed | 1 |
| 001ABC | backup | XXX-YYYY-ZZZ | Zuul | Passed | 1 |
| 001ABC | backup | XXX-YYYY-ZZZ | CBS | Passed | 1 |
| 001ABC | backup | XXX-YYYY-ZZZ | WFM | Passed | 1 |
| 001ABC | backup | XXX-YYYY-ZZZ | ADM | Failed with exception (critical errors) | 5 |
| 001ABC | backup | XXX-YYYY-ZZZ | Agent Service | Failed | 7 |
| 001ABC | backup | XXX-YYYY-ZZZ | Addon Layer | Failed | 7 |

FIG. 6

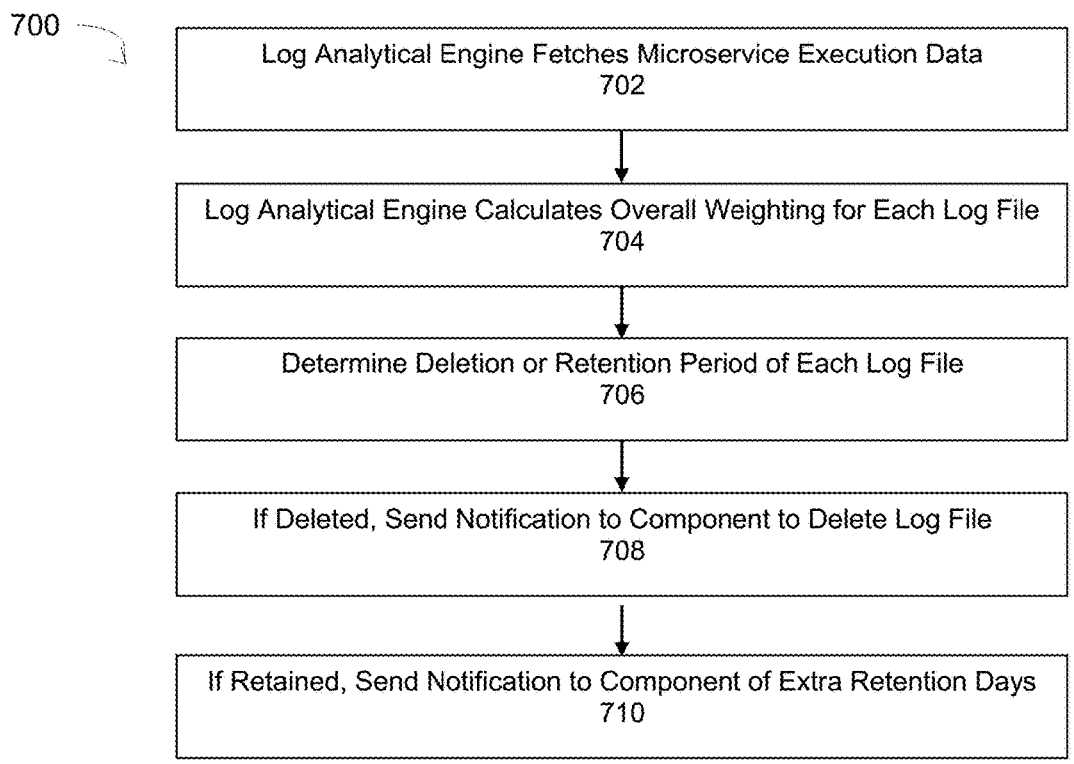

FIG. 7

INTELLIGENT LOG ANALYSIS AND RETENTION FOR MICROSERVICES APPLICATIONS

TECHNICAL FIELD

Embodiments are generally directed to large-scale backup systems, and more specifically to log analysis and retention for microservices applications.

BACKGROUND

Data protection comprising backup and recovery software products are crucial for enterprise-level network clients. Customers rely on backup systems to efficiently back up and recover their application data in the event of user error, data loss, system outages, hardware failure, or other catastrophic events to allow business applications to remain in service or quickly come back up to service after a failure condition.

Distributed microservices-based models continue to grow as an architecture choice of building the complex application stacks. Microservices architecture is becoming a de-facto choice for applications to reduce multiple level of dependencies in agile methodologies and development cycles. In a monolithic application, components invoke one another via function calls and may use a single programming language. A microservices-based application, however, uses distributed architecture with multiple services interacting each other. These services may run on single machine or highly available clustered machines. These microservices also interact with other software service running on different machine such as agents running on different host. Each service instance is performing unique set of tasks which is independent of other services and communicates with other microservices using either REST API or message bus architecture.

In a highly distributed microservices architecture, each service logs the information into respective log directory/repository configured for that microservice. That is, if there are N number of microservices then, there would be N different logs. In this system, an operation performed by a backup application could involve one or many microservices. Therefore, the communication could be one-to-one, where a single request is processed by one service, or one-to-many, where a single request could be processed by multiple services.

If a single data protection operation being performed involves relatively large numbers of microservices (i.e., one-to-many interaction), then there will be that same number of logs to be analyzed after a failure event. The complexity of failure can lead to repeated analysis of multiple sets of these logs. If the operation being performed involves an external component (such as an agent host or proxy host), then the analysis may span across multiple hosts, including a production backup application host.

Backup applications generally retain the logs for internal or external components based on simple factors such as aging of log files. Present systems lack the ability to identify patterns of failure and only retain those logs that have failed jobs or jobs that have failed with exceptions. In a typical production environment, there are many overlapped operations being serviced by the backup application and each of these operations may involve N×M number of combinations of internal and external components. Thus, a failure could spread across multiple internal and external logs, and traditional log deletion mechanisms (e.g., aging or similar simple factors) result in a high probability of losing those logs during critical failure analysis. Furthermore, problems may be very intermittent in a production environment, and if impact of failure is very high and if application has lost those logs then only option is to wait for a next failure occurrence, which can impose great frustration and cost on users.

What is needed, therefore, is a system and method that provides an intelligent way to determine which logs to be kept and on what basis, and how long a backup server should keep these logs.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. DellEMC, NetWorker, Data Domain, Data Domain Restorer, and PowerProtect Data Manager (PPDM) are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 4 is a block diagram that illustrates components of a client-server system performing an intelligent log retention process, under some embodiments.

FIG. 5 is a table listing example parameters for deleting logs in an intelligent log deletion process, under some embodiments.

FIG. 6 is a table that illustrates a schematic format for example operations, under some embodiments.

FIG. 7 is a flowchart illustrating an overall process of intelligent log analysis and retention for microservices, under some embodiments.

DETAILED DESCRIPTION

Figure 1:
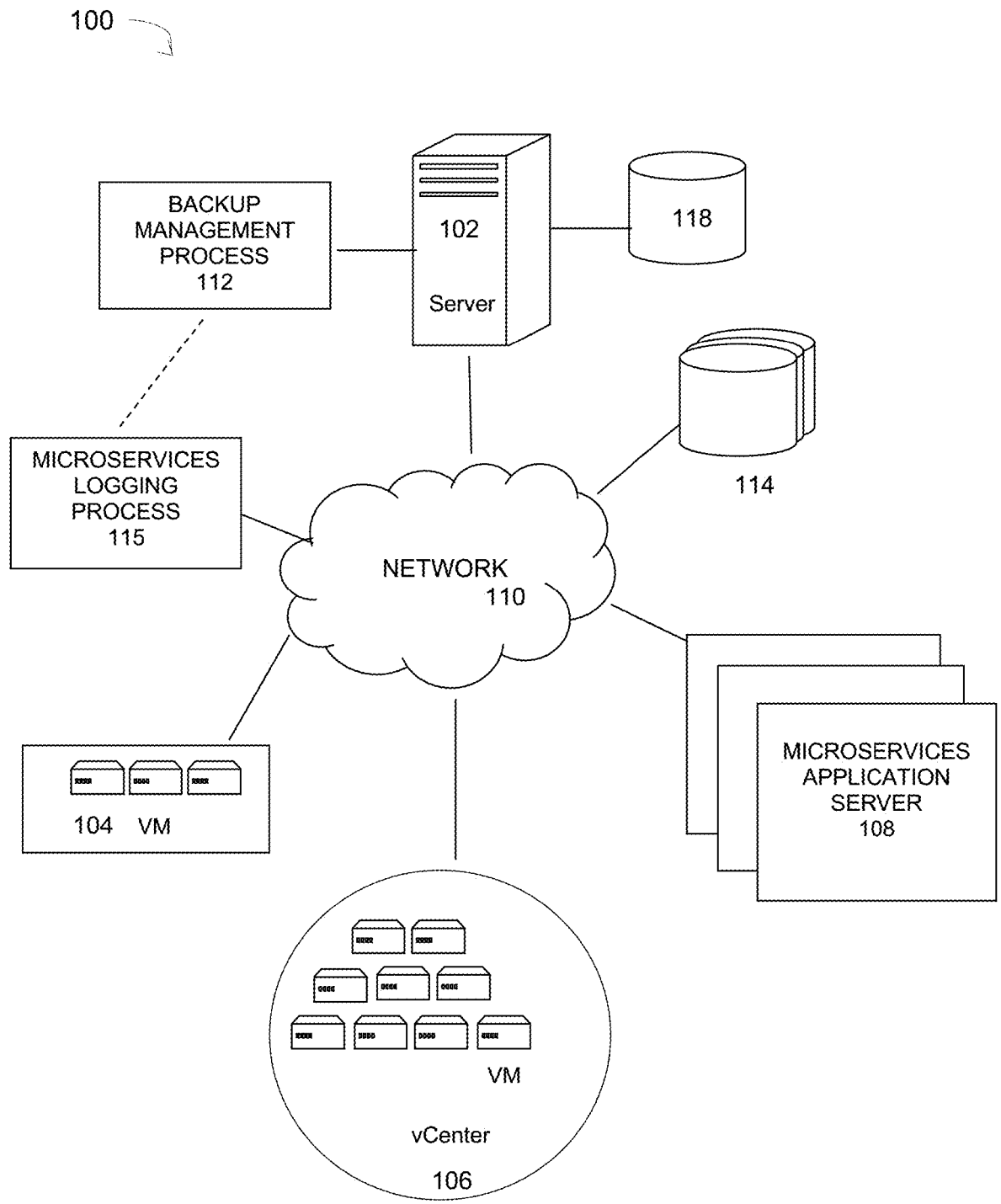
FIG. 1 is a diagram of a large-scale data backup system implementing a configuration drift management process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the described embodiments encompass numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. The computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that embodiments may take, may be referred to as techniques. In general, the order of the steps of disclosed processes may be altered within the scope.

Some embodiments involve backup techniques in a distributed system, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more processes and components for providing intelligent log analysis and retention for microservices applications. Such log analysis is helpful in troubleshooting failure conditions that may occur intermittently or repeatedly within a microservices environment. Executed operations by microservices, applications, or components generate logs, and these logs are classified based on certain parameters. A default log retention period defines how long the logs are stored in the system, and a log analytical engine determines and assigns weights constituting additional retention time to keep logs for failed operations. These logs can then be analyzed to determine causes of the failure, and build failure models to predict future failure conditions. Logs for successful operations can be timely deleted to save storage space.

As shown in FIG. 1, system 100 includes a network server computer 102 coupled directly or indirectly to the target VMs 106, and to data sources 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform.

The data sourced by system 100 may be stored in any number of other storage locations and devices, such as local client storage, server storage (e.g., 118), or network storage (e.g., 114), which may at least be partially implemented through storage device arrays, such as RAID components. Embodiments can be used in a physical storage environment, a virtual storage environment, or a mix of both, running a deduplicated backup program. In an embodiment, system 100 includes a number of virtual machines (VMs) or groups of VMs that are provided to serve as backup targets. Such target VMs may be organized into one or more vCenters (virtual centers) 106 representing a physical or virtual network of many virtual machines (VMs), such as on the order of thousands of VMs each. Other data sources having data to be protected and backed up may include other VMs 104. The data sourced by the data source may be any appropriate type of data, such as database data that is part of a database management system. In this case, the data may reside on one or more storage devices of the system, and may be stored in the database in a variety of formats.

In an embodiment, server 102 is a backup server that executes a backup management process (backup program) 112 that automates the backup of network data using the target VM devices or the NAS (or other) storage devices. In an embodiment, the backup process uses certain known full and incremental (or differencing) backup techniques along with a snapshot backup process that is used to store an image or images of the system(s) to be backed up prior to the full or incremental backup operations.

In an embodiment, the network system may be implemented as a DellEMC PowerProtect Data Manager (or similar) data protection system. This is an enterprise-level data protection software platform that automates data backups to tape, disk, and flash-based storage media across physical and virtual environments. A number of different operating systems (e.g., Windows, MacOS, Linux, etc.) are supported through cross-platform supports. Deduplication of backup data is provided by integration with systems such as DellEMC Data Domain and other similar storage solutions. Thus, the server 102 may be implemented as a DDR Deduplication Storage server provided by DellEMC Corporation. However, other similar backup and storage systems are also possible. In a general implementation, a number of different users (or subscribers) may use backup management process to back up their data on a regular basis to virtual or physical storage media for purposes of data protection. The saved datasets can then be used in data restore operations to restore any data that may be lost or compromised due to system failure or attack.

In an embodiment, server 102 running backup program 112, or any other suitable application, operates in a microservices-based architecture system involving possibly one or more other microservices servers and applications 108. In this type of system, an application is organized as a collection of loosely-coupled services functioning together through lightweight protocols. To serve a single user request, a microseivices-based application can call on many other microservices to compile a response. This decoupling the use of carefully defined interfaces that are treated as a public API. Each microservice is an isolated, independent component that performs a sub-operation, typically as a single business use case, such as data protection, and so on. During the course of operation, each microservice logs its operation activity in a log file.

Microservices architecture treats each function of an application as an independent service that can be altered, updated or removed without affecting the rest of the application and builds a distributed application using containers. All services are created individually and deployed separately from one another. This architectural style allows for rapid and tailored scaling services based on specific business needs. Services can also be rapidly changed without affecting other parts of the application. Because of this modular approach, applications can be distributed across clouds and data centers, adding new features only requires those individual microservices to be updated, and network services are software-defined and run as a fabric for connecting microservice.

As stated above, a typical one-to-many interaction in a microservices system can create a great many (X) logs to be analyzed during a failure case. The complexity of failure can lead to repeated analysis of multiple set of these logs, and if the operation involves an external component, then the analysis may need to span across multiple hosts including a production backup application host. Embodiments provide an intelligent way to determine which logs to be kept and on what basis, and how long a backup server should keep these logs. This feature requires some intelligent mechanism built within backup application that comprises of multiple services as well as interaction with many other external components/services, where logs are retained based on failure pattern matching technique.

Backup applications will generally retain the logs for internal or external components based on factors such as disk capacity threshold or aging of a log file. In a typical production environment, there can be a great many overlapped operations being serviced by the backup application. As each of these operations may involve N times M number of combinations of internal and external components respectively, the failure could spread across multiple internal and external logs. In present backup applications that use a traditional log deletion mechanism based on, such as aging or typical log retention period, there is very high probability of losing those logs during critical failure analysis. At present, there is no mechanism to retain only those logs that needs to be retained by automatically adjusting the individual microservice level log retention based on operation status (i.e., success/fail). It is a Boolean decision, either retain all of them or delete all of them based on log retention mechanism.

In order to provide a way to identify patterns of failure and retain only those logs that have failed jobs or jobs that have failed with exceptions, embodiments provide an intelligent log retention process based on operation success/failure rate by identifying the components involved in sub-operation. For example, a single operation may be performed by five components and out of those five components, two components may fail during specific operation, but three components may succeed.

Embodiments provide a mechanism to retain only those logs that need to be retained by automatically adjusting the individual microservice level log retention based on operation status. This removes the limitations of systems that force a simple Boolean decision of either retaining or deleting all logs based on application success or failure, as imposed by current log retention policies.

Figure 2:
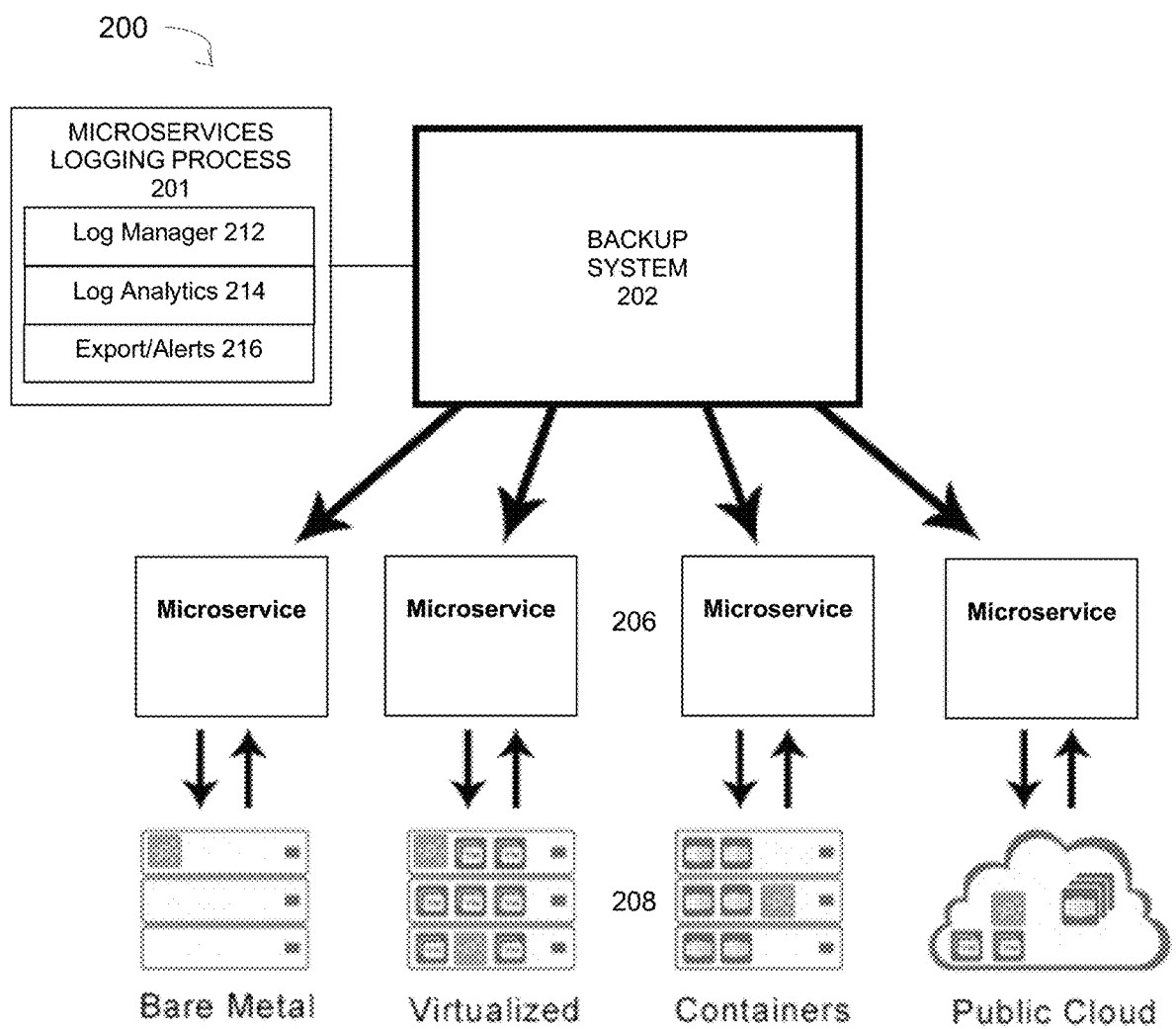
FIG. 2 illustrates a microservices-based environment that implements an intelligent logging process, under some embodiments.

FIG. 2 illustrates a microservices-based environment that implements an intelligent logging process, under some embodiments. System 200 is an example of a highly distributed microservices-based system in which a single request for an operation, such as a backup operation issued by backup system 202 is fulfilled by multiple microservices 204 and applications running across the hosts in possibly a variety of different contexts 206. Each microservice and application 204 generates their own logs for the requested operation.

During the course of operation, each microservice logs its operation activity in a log file. Each log conforms to a defined format, such as date—timestamp—context_ID—trace_ID—error—criticality, and so on, depending on the system configuration. Such a format can be defined by an industry standard format, or it can be a proprietary format, and must at least identify the operation to which the log belongs, such as through the context_ID and trace_ID fields.

In general, logs are rotated in the system based on system factors such as log retention time and disk space utilization. It may be desirable to retain logs for as long as possible, however, logs can stack up very quickly thus consuming a lot of storage space, and slowing access to older logs. Thus, it is desirable to balance log retention against storage space and access speed constraints. Logs are thus stored in a database and rotated in accordance with a set log retention schedule, and different microservices may have different retention times. A typical retention period may be on the order of seven days, and a soft threshold value (e.g., 60%) and a hard threshold value 90%) dictate when the system starts purging the logs from the database. Purged logs are not available for analysis, and thus failed operations with purged logs cannot be fully investigated. In such a case, users traditionally needed to wait for the failure to re-occur to obtain the failure log. Embodiments provide a log retention system that automatically retains failure logs for extended periods of time to provide time for user analysis of the sequence of events leading to failed operations and microservices. To balance the storage and performance needs, failed logs are retained for possibly longer than the default period, while successful logs are purged possibly before the default period, thus maintaining a balance in the log database.

In an embodiment, the sub-operations performed by individual microservices and applications 204 are linked together by a correction identifier (trace_ID) and some other metadata. This solves the problem of tracing an operation in multiple microservices and applications. However, this does not solve the optimal log management for deletion and retention. Each microservice and application might have different retention and rotation periods and deletion patterns. Embodiments address these challenges where logs are dispersed, but they are still interlinked and interdependent through a base application or server 202. Directly deleting a log of a microservice or an application might create challenging situations for further troubleshooting and overuse the disk space needed for retaining the logs for longer periods. As shown in FIG. 2, system 200 includes an intelligent microservices logging process 201 that decides when and which logs should be retained for longer periods, which logs can be deleted immediately, and when to perform a force deletion to avoid the foreseeable crash or hindrance due to over-used disk spaces by the logs, without losing the capabilities of troubleshooting an operation.

In an embodiment, the microservices logging process includes several sub-components or sub-processes to implement the intelligent logging process for microservice-based architectures. These include an overall logging Framework including a log manager for logging microservice events and performing, which can be embodied in a log collector microservice 212, and a log analytical engine 214, along with other components 216, such as an export engine, alert generator, and so on.

Figure 3:
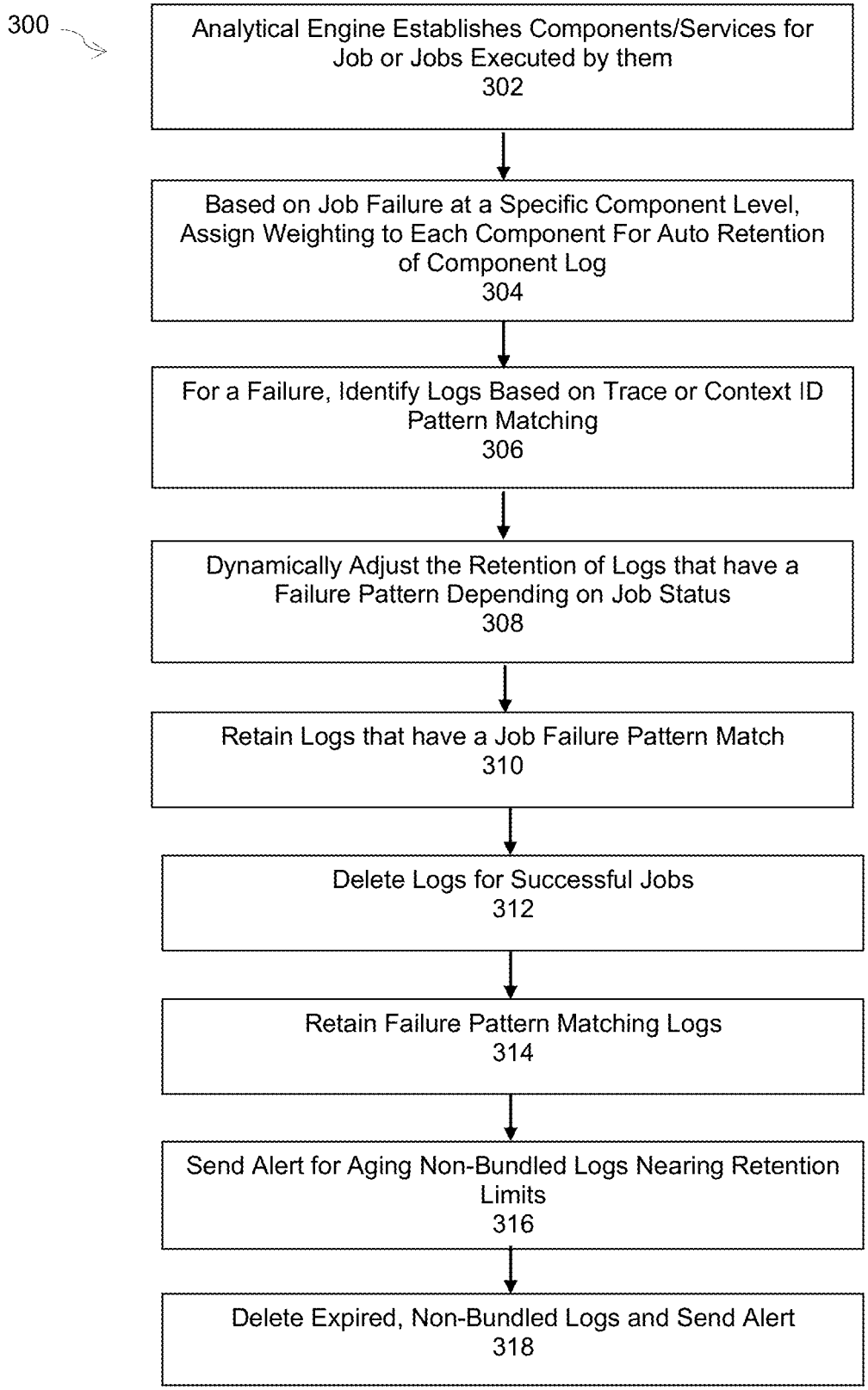
FIG. 3 is a flowchart illustrating a method of implementing an intelligent logging process for microservices-based systems, under some embodiments.

FIG. 3 is a flowchart illustrating a method of implementing an intelligent logging process for microservices-based systems, under some embodiments. As shown in FIG. 3, process 300 begins with the analytical engine establishing the components or services involved for job or group of jobs being executed by them, 302. The analytical engine assign a weighting to each component for the auto retention of that components logs based on a job failure at the specific component level, 304. In the event of a failure, the process identifies the logs involved for that failure based on trace ID or context ID pattern matching, 306. The process dynamically adjusts the retention of those logs that have a failure pattern depending on job status, 308. It then retains those logs that have a job failure pattern match, 310. The process dynamically reduces the log retention for successful operations to ensure balancing of disk space by deleting lower priority logs, 312. Logs that have a failure pattern matched and that are retained for failure case are collected by a log bundle/log export process for future use by the analytical engine for pattern matching, 314. In this way a body of data is used to model the possible failure patterns. The alert generation process sends a periodic alert if any retained logs have still not been accessed/bundled and if they are nearing their retention limits, 316. Log retention can be extended for a period of time (e.g., up to max of 4 weeks) depending on disk space utilization. After this period, these retention logs are force deleted, and a corresponding alert can be sent, 318.

FIG. 4 is a block diagram that illustrates components of a client-server system 400 performing an intelligent log retention process, under some embodiments. For the example of FIG. 4, server 402 may be a backup server (e.g., server 102) that executes a microservices-based backup process using microservices accessed over the network 110. Although embodiments are described in relation to backup programs, it should be noted that embodiments are not so limited and any microservices-based application or applications may be used.

In system 400, server 402 is a backup server invokes various microservices 410 to perform control backup operations executed by client 403. The server 402 and client 403 are coupled over a network 401 and message bus 408 through respective endpoints 412 and 414. Client 403 is a backup client that executes certain backup program operations such as data backups, restores, deletes, and so on, through local backup/restore agents 418. These operations are logged using standard operation logging processes controlled by a log manager.

For the embodiment of FIG. 4, client 403 utilizes a logging framework in which every log generated during an operation (backup/restore/delete etc.) has a trace ID and context. Every log statement has enough details to determine which operation was performed, what time it executed, and whether it passed or failed and why. Whenever any backup agent 418 starts any operation, it notifies the log manager agent 420 about its log file name along with other relevant details.

The log manager component 420 is responsible for managing logs on the client 403. It keeps track of when a log was generated and when a log was exported if user has requested the log. This component also has the functionality to delete the requested log. Log manager 420 listens to input from the server 402, and the server specifies which log to delete and when. The log manager 420 also handles logs from other microservices 410. These microservices log enough information about the trace IDs and contexts, and the log manager 420 is aware of all the logs 422 generated in the overall system 400. The logs 422 can be stored in a standard log database or other similar data structure. Such logs may be stored in the client 403, or they may be stored in a different device, such as server 402 or other network storage.

Each component within system 400 includes a log manager that collects the logs for that respective component, since in a microservice architecture, each microservice is an independent processing entity.

For the embodiment of FIG. 4, server 402 includes a log collector microservice or component 406. In the server, this component also acts as the log manager for the server. It collects logs its own server processes as well as for its microservices 410. It can also collect the logs 422 from the clients 403 and other components, if requested, create a bundle of requested logs, and then export them to the requesting user, if necessary. This information regarding which logs were collected and when, are recorded in a database. This information is then used by the log analytical engine 404 to predict when is the right time to delete and which files.

The log analytical engine 404 predicts when and which logs should be deleted versus saved. This both helps to reclaim free space from successful operations that do not need saved logs, and at the same time, saves information from failed operations that could be potentially used for troubleshooting problems and compiling a failure model.

The log analytical engine uses certain parameters to determine which logs and when they should be deleted. FIG. 5 is a table listing example parameters for deleting logs in an intelligent log deletion process, under some embodiments. Table 1 of FIG. 5 lists the example parameters as retention days, failure, success, warnings/alerts, critical errors, frequency, exported, and microservice/application operation. Other similar parameters may also be used depending on system configuration and requirements. The 'retention day' parameter specifies the number of days that logs are to be retained. Such a retention period may be expressed as a set number (e.g., 30 days), or it may be expressed as a range with soft and hard limits (e.g., 1 week to two weeks). The weighting for this parameter is calculated based on the weightings for the other parameters. The 'failure' parameter applies to a failed operation. If a failure occurs multiple times for the same operation, only a last few failed logs are kept. An example weighting value for this parameter is 7 days. The 'success' parameter applies to a successful operation. If a success occurs multiple times for the same operation, only a last few success logs are kept. An example weighting value for this parameter is 1 day. Warnings and alerts messages are given an example weighting of 4 days, and critical error warnings and alert messages are given an example weighting of 5 days. An operation may succeed, but still generate certain warnings or alerts. This is the case where errors are repeated and need attention. In this case, an example weighting might be 6 days. Upon request, the system 400 will export requested logs 422 to a requesting user. These logs are given an example weighting of 3 days.

The 'microservice/application type or status' parameter specifies variables that might cause a log to be retained for a longer period regardless of success or failure of the operation. For example, certain microservices may be involved in many operations or be involved in certain critical operations, such as data deletions. There may be a circumstance where a specific microservice log is to be retained for longer period. The user could then explicitly set the higher retention within service configuration file. In that case, if the logs from other services are deleted, then logs for the service with higher retention would be retained and not be deleted. However, if the service is part of the sub-operation then the retention weighting would be automatically get calculated for logs for respective services. These logs would be deleted as per their retention weighting calculation.

The weighting value specifies the number of days in excess of a default retention time to keep a log in the database. For example, a value '1' indicates retain a log a default number of days based on the centralized log retention policy. A higher weighting value 'X' indicates to retain the log for X number of more days more than the default. Thus, a value '7' means keep the log for an additional 7 days, which would be the case of a failed operation log. In this case, a failed log is desired to be kept longer than the log of a successful operation, which is kept for only the minimum (default) number of days. If the end user exports the log into bundle, then it means that the user has acknowledged the error, and consequently the weighting is automatically reduced to 3 days for all the components so that they do not unnecessary pile up in the server or agent host. The weighting values in Table 1 ranging from 1 day to 7 days extra are provided for purposes of example only, and many other weightings and units of time can be used, depending on system configuration and requirements.

In an embodiment, the weightings may cause only an increase in retention period (days) over a default value. For the example of FIG. 5, the weighting value represents days added to a default value, where '1' or '0' indicates no addition to the default number of days. Alternatively, a negative value may be used to provide a faster purging of log files than the default retention period. This is useful for more quickly purging or rotating logs for successful operations in order to free up disk space. For example, if the default retention is seven days, a 'success' weighting of '−4' might mean that the logs are purged after 3 days instead of weighting the full 7 days. The example weighting values are given as number of days, however, other weighting values may be used, such as a fraction or percentage of the default time, and so on.

Many operations can involve a number of different microservices, each of which may have a different weighting. If a microservice is used by or uses one or more other microservices, the weighting for each microservice will be the longest of the weightings for each of the microservice. That way, logs are retained for an equally long period of time for combinations of microservices. For example, if there are three microservices, A, B, and C, and both A and B are successful and not critical, their logs will be retained for seven days. If C has failed and/or is a critical component with warnings, it's log will be extended an additional seven days for a retention period of 14 days. Since C is used with A and B for this operation, the log retention times for A and B will also be extended for the extra seven days. That way, all of the logs for all of the relevant microservices for the operation involving C will be available for analysis during this extended time.

Some of the parameters in Table 1 are user configurable such as threshold, and the weighting assigned to each parameter. Others are hard-coded or defined by the system, such as backup frequency, and so on.

Each log message conforms to a certain internal schematic format. Whenever an operation is requested by user or scheduled activity or system job, the operation is divided into sub-tasks and these sub-tasks are performed by multiple microservices and applications. Each involved layer generates its own log. When the operation completes, system has details for each operation in a defined schematic way.

FIG. 6 is a table that illustrates a schematic format for example operations, under some embodiments. Table 2 of FIG. 6 lists certain example operational parameters and results. The example of FIG. 6 illustrates an example backup operation having ID '001ABC.' Such an operation can be a centralized filesystem backup operation using PowerProtect Data Manager. This example operation involves various microservices listed as 'Components involved.' For this example, the components include AAA, Zuul, CBS, WFM, ADM on the server, and agent service and addon services on the agent host (client). For a given operation, the trace ID or 'Correlation ID' XXX-YYY-ZZZ along with context gets percolated to all of these microservices (components). The 'Result' field lists the success or failure of the components in executing the operation. For the example of FIG. 6, the operation succeeded at AAA, Zuul, CBS and WFM, then failed with exception at ADM (with a critical error only), but actually failed on Agent service and addon layer. In this case, the weighting would be assigned as specified in Table 1 of FIG. 5.

Embodiments can be further enhanced to accommodate a co-relation weighting, such as depending on the operation type. In this case, the weighting can be adjusted for critical components involved in that co-relation. For example, if a backup operation failure is due to any of the policy service, workflow engine, respective pillar service and infrastructure service (such as Elastic search), then all the logs from these services should be retained for a longer duration regardless of whether a sub-operation succeeded in any of those components involved. In this case, a co-relation add factor can be included in the weighting determination. Other similar factors can be used to modify the weightings as well.

With reference back to the client-server network system 400 including different computing devices implementing the components described above, FIG. 7 is a flowchart illustrating an overall process of intelligent log analysis and retention for microservices, under some embodiments. As shown in FIG. 7, process 700 begins in step 702 with the log analytical engine 404 periodically fetching data from various sources regarding operations executed by one or more microservices or applications 410. The data is formatted in the schema illustrated and described in Tables 1 and 2, above. The periodicity of this fetching operation can be user defined or set by the system, and is typically on the order of hours or days.

The system then generates appropriate weightings for the different microservices with respect to the executed operation, and based on the user-configured and system-generated weightings for each parameter, the log analytical engine computes an overall weighting for each log file, 704. Based on the overall weighting, it then decides if the file is to be deleted, retained for the default number of days, or retained for an extra number of days, 706.

If file is to be deleted, the log analytical engine sends a notification to that component via message bus 408, and the related component or components delete the log file, 708. If the file is to be retained for extra days, it the sends notification to that component about this extra retention period, 710.

In an embodiment, the logs for failed components are bundled and sent to a user or process for further analysis. This analysis is used to help troubleshoot the failure conditions to determine causes of the failure. The failure analysis can also be used to build failure models to predict future failure conditions, which can then be used by certain artificial intelligence (AI) or machine learning (ML) processes.

As described above, in an embodiment, system 100 processes that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein.

Figure 8:
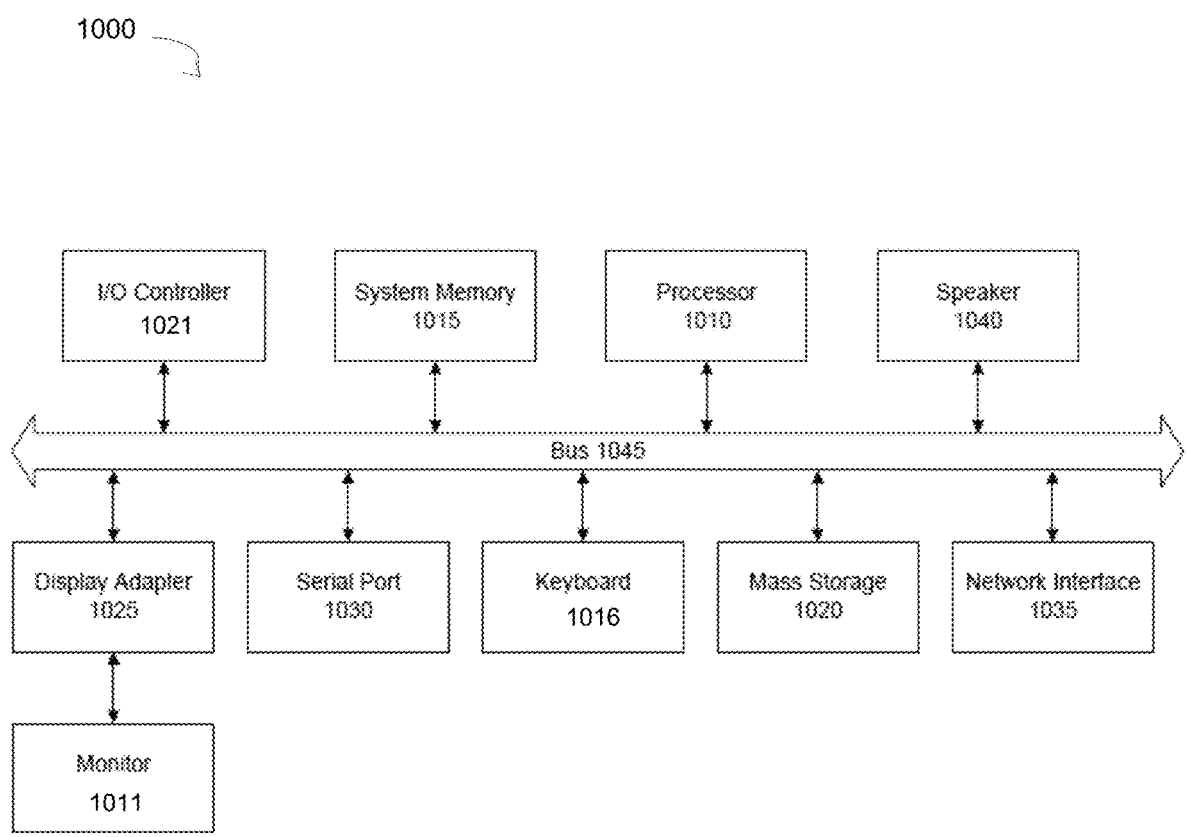
FIG. 8 is a block diagram of a computer system used to execute one or more software components of a system for performing some of the processor-based functions, under some embodiments.

FIG. 8 is a block diagram of a computer system used to execute one or more software components of a system for performing some of the processor-based functions, under some embodiments. The computer system 1000 includes a monitor 1011, keyboard 1016, and mass storage devices 1022. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is but one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of retaining logs in a microservices computing system, comprising:

fetching, in a server computer of a data protection system, microservice execution data for each of a plurality of microservices executing an operation for the system, wherein each microservice maintains a log storing the execution data, wherein each microservice comprises an isolated and independent processing entity maintaining its own logs in a log file and further wherein the operation is executed by a plurality of microservices working together as one or more co-dependent sub-processes;

defining a default period of time to store a respective log of each microservice in a database;

adjusting the default period of time to store each respective log based on success or failure of the operation by each microservice; and modifying, in the server computer, the adjusted default period of time by one or more weighting values assigned to respective additional parameters of each microservice, wherein a highest adjusted default period of time is applied to all co-dependent microservices executing the operation.

2. The method of claim 1 further comprising sending an alert notification to a respective microservice indicating adjustment of the default period of time based on the success or failure of the operation and any modification by the modifying step.

3. The method of claim 1 wherein a failure of the operation causes the retention period to be extended by an additive period of time in excess of the default period.

4. The method of claim 1 wherein a success of the operation causes the retention period to be reduced by a subtractive period of time shorter than the default period.

5. The method of claim 3 wherein the additional parameters comprise at least one of, for a respective microservice: warning and alert status, criticality of errors, frequency of occurrence of errors, exportation of logs, and microservice type or status.

6. The method of claim 5 wherein the logs are formatted in a defined log format including data fields for date, timestamp, context identifier, and trace identifier.

7. The method of claim 6 wherein the context identifier and trace identifier associate a log with a corresponding operation.

8. The method of claim 1 wherein the default period of time is defined by a log retention policy and is on the order of several days.

9. A system for retaining logs in a microservices computing system, comprising:

a processor-based log collector microservice fetching microservice execution data for each of a plurality of microservices executing an operation, wherein each microservice maintains a log storing the execution data, wherein each microservice comprises an isolated and independent processing entity maintaining its own logs in a log file, and wherein the operation is executed by a plurality of microservices working together as one or more co-dependent sub-processes, and further wherein a highest adjusted default period of time is applied to all co-dependent microservices executing the operation;

a log analytical engine defining a default period of time to store a respective log of each microservice in a database, and adjusting the default period of time to store each respective log based on success or failure of the operation by each microservice and one or more additional parameters; and a hardware alert component sending an alert notification to a respective microservice indicating adjustment of the default period of time based on the success or failure of the operation.

10. The system of claim 9 wherein a failure of the operation causes the retention period to be extended by an additive period of time in excess of the default period, and wherein a success of the operation causes the retention period to be reduced by a subtractive period of time shorter than the default period.

11. The system of claim 9 wherein the additional parameters comprise at least one of, for a respective microservice: warning and alert status, criticality of errors, frequency of occurrence of errors, exportation of logs, and microservice type or status.

12. The system of claim 9 wherein the logs are formatted in a defined log format including data fields for date, timestamp, context identifier, and trace identifier, and wherein the context identifier and trace identifier associate a log with a corresponding operation.

13. A computer-implemented method of retaining logs in a microservices computing system, comprising:

fetching, by a processor-based component in a server of a data protection system, log files for microservices executing an operation, wherein each microservice of the microservices comprises an isolated and independent processing entity maintaining its own logs in a log file, and wherein the operation is executed by a plurality of microservices working together as one or more co-dependent sub-processes, and further wherein a highest adjusted default period of time is applied to all co-dependent microservices executing the operation;

calculating an overall weighting for each log file based on a success or failure of the operation by a respective microservice along with one or more additional parameters, wherein the overall weighting extends or shortens a default retention period of a respective log file; and sending an alert notification to a microservice indicating an extension or shortening of the default retention period of its log files.

14. The method of claim 13 wherein a failure of the operation results in an extension of the retention period of the log file is a log database.

15. The method of claim 14 wherein a success of the operation results in a decrease in the retention period of the log file or deletion of the imminent deletion of the log file from the log database.

* * * * *